Nov. 9, 1943.  E. MORATH  2,334,157
LIGHTING GENERATOR
Filed May 26, 1942
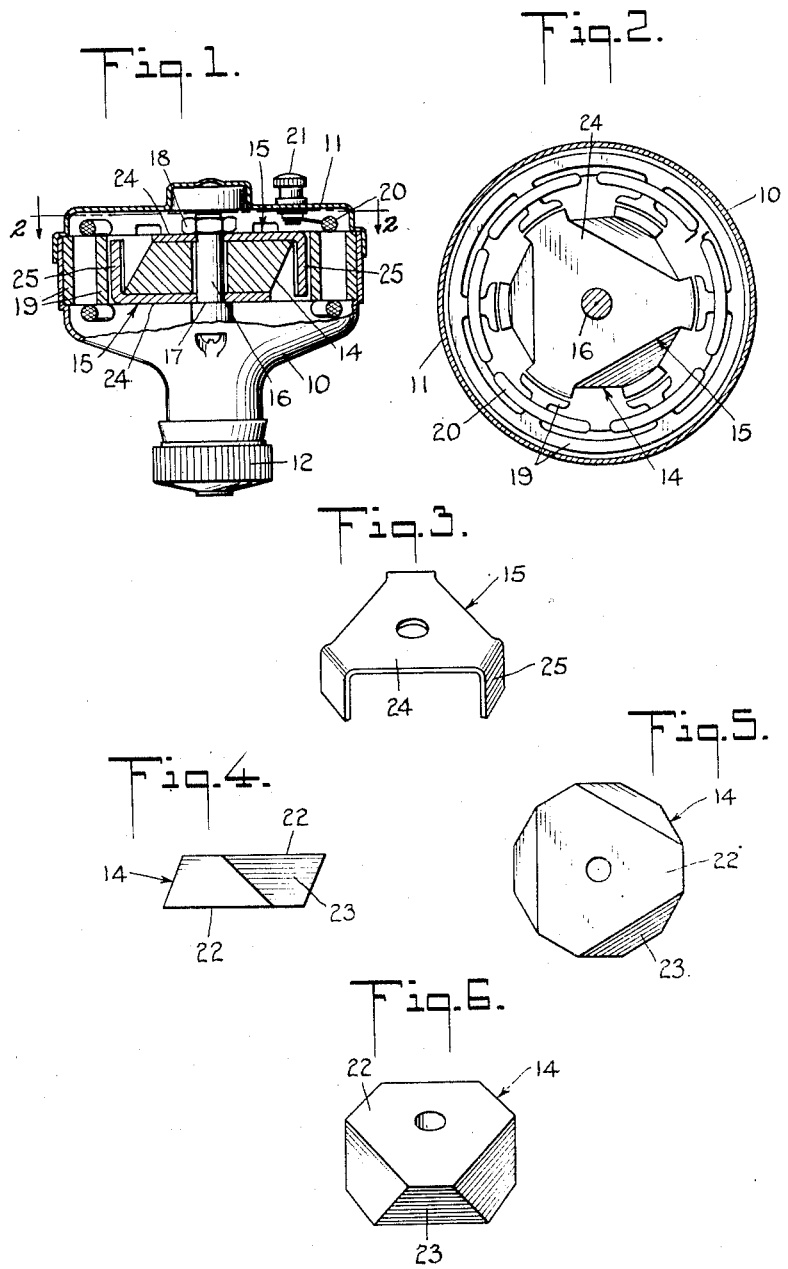
INVENTOR
Erich Morath
BY
his ATTORNEY Patented Nov. 9, 1943

2,334,157

UNITED STATES PATENT OFFICE 2,334,157

LIGHTING GENERATOR

Erik Morath, Stockholm, Sweden

Application May 26, 1942, Serial No. 444,549
In Sweden March 3, 1941

8 Claims. (Cl. 171—209)

My present invention relates to an electric generator intended chiefly for use in vehicles such as bicycles or the like for furnishing lighting current and provided with a rotary permanent magnet as well as pole pieces of soft iron cooperating with said magnet. One of the objects of my invention is to provide a generator of this kind, in which the magnet and the pole shoes are so formed and arranged that the flux leakage is reduced to a minimum and a substantially constant induction is obtained in the magnet, the flux passing through said magnet approximately in an axial direction. For this purpose the magnet according to the invention consists of a polyhedron, the peripheral bounding surface of which is composed of a number of surface portions of which alternate portions form an acute and intermediate portions form an obtuse angle with a plane disposed at right angles to the axis of rotation of the magnet, as seen outside the magnet and at the same side of said plane. The size of the cross section of the magnet, in the case of a lighting generator according to the invention, preferably may be constant or approximately constant along the whole length of the magnet axis. In a suitable embodiment of the invention the end surfaces of the magnet may be at right angles to the axis. The magnet itself, if desired, may be so formed that a section located between said end surfaces and at right angles to its axis has the shape of a regular polygon, such as a hexagon. The surface portions of the magnet may suitably be trapezoids congruent with each other. All pole pieces are suitably similar in shape, their pole shoes being so arranged that they all embrace the surface of the magnet. Each of said pole pieces consists suitably of a flat portion bearing against one end surface of the magnet and having similar shape to said surface; from the corners of which portion tongues forming the pole shoes extend at right angles.

The invention will be hereinafter more fully described with reference to the accompanying drawing from which the characteristic features of the invention will be seen, and of which:

Fig. 1 is a side view, partially in cross-section of a generator embodying my invention;

Fig. 2 is a cross-sectional view taken on the line 2—2 of Fig. 1;

Fig. 3 is a perspective view of a pole piece;

Fig. 4 is a side view of a permanent magnet;

Fig. 5 is a top view of the magnet shown in Fig. 4; and

Fig. 6 is a perspective view of the magnet shown in Figs. 5 and 6.

In the drawing, reference character 10 designates the casing of the lighting generator, 11 its cover and 12 a driving roller connected to the rotatable generator parts. These rotatable parts comprise a permanent magnet 14 as well as pole pieces 15 of soft iron cooperating with said magnet. The magnet 14 and the pole pieces 15 are both fitted to the shaft 16 of the generator, which is formed with a shoulder 17 against which the parts 14 and 15 are pressed by a nut 18 screwed on to the shaft. The stator of the generator is designated by 19 and the windings of the stator by 20. On rotation of the magnet an electric current is set up in known manner in said stator windings. One end of the winding 20 is connected to a terminal screw 21 insulated from the cover of the generator casing while the other end of the winding is grounded to the casing.

The permanent magnet shown in the drawing is formed as a body with hexagonal end surfaces 22 which are congruent with each other. The remaining surface of the body is divided into six trapezoidal portions 23 congruent with each other. The pole pieces 15 bearing against the end surfaces 22 of the magnet consist each of an approximately triangular member 24 from the corners of which suitably rectangular extensions 25 extend at right or approximately right angles, that is they are substantially parallel to the axis of rotation. The extensions 25 form the pole shoes of the rotor. The shape of the pole piece 15 is clearly seen from Fig. 3. As appears more clearly from Fig. 1, the magnet 14 is located between the pole pieces 15, each pole shoe coming opposite one of the parts 23 of the magnet. Between the two parts 25 and 23 there are formed wedge-shaped air gaps, the section of which increases towards the ends of the pole shoes.

The magnet shown in the drawing and described above may evidently be varied; instead of six there may thus be arranged four or eight poles with equally good results.

What I claim is:

1. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an obtuse angle with a plane disposed at right angles to the axis of rotation of the rotor.

2. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an obtuse angle with a plane disposed at right angles to the axis of rotation of the rotor, the cross-sectional area of the magnet being substantially the same at all points along said axis.

3. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an obtuse angle with a plane disposed at right angles to the axis of rotation of the rotor, the end surfaces of said magnet being disposed substantially at right angles to said axis.

4. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an obtuse angle with a plane disposed at right angles to the axis of rotation of the rotor, the cross-section of said magnet at the axially mid-point thereof being a regular polygon.

5. In an electric generator, a stator having a winding, and a rotor magnetically associated therewith, said rotor including pole pieces and a permanent magnet in the shape of a polyhedron the peripheral bounding surface of which comprises a plurality of congruent trapezoidal surface portions of which alternate portions form an acute angle and intermediate portions form an obtuse angle with a plane disposed at right angles to the axis of rotation of the rotor.

6. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an obtuse angle with a plane disposed at right angles to the axis of rotation of the rotor, said pole pieces having extensions disposed between said surface portions and said stator and extending substantially parallel to said axis.

7. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an obtuse angle with a plane disposed at right angles to the axis of rotation of the rotor, each of said pole pieces including a disc portion in contact with and having substantially the same shape as the respective end surfaces of said magnet and pole shoes extending parallel to said axis from the edges of said disc portion.

8. In an electric generator, a stator having a winding, and a rotor magnetically associated therewith, said rotor including pole pieces and a permanent magnet in the shape of a polyhedron the peripheral bounding surface of which comprises a plurality of surface portions of which alternate portions form an acute angle and intermediate portions form an acute angle with a plane disposed at right angles to the axis of rotation of the rotor, said pole pieces having extensions disposed between said surface portions and said stator and extending substantially parallel to said axis, whereby wedge-shaped air gaps are formed between said extensions and said surface portions.

ERIK MORATH.